United States Patent [19]

Reilly

[11] 4,406,866
[45] Sep. 27, 1983

[54] RECOVERY OF REFRACTORY METAL VALUES FROM SCRAP CEMENTED CARBIDE

[75] Inventor: Kenneth T. Reilly, Towanda, Pa.

[73] Assignee: GTE Products Corporation, Stamford, Conn.

[21] Appl. No.: 420,459

[22] Filed: Sep. 20, 1982

[51] Int. Cl.³ ............................................. C01G 41/00
[52] U.S. Cl. ....................................... 423/61; 423/53
[58] Field of Search ................................... 423/53, 61

[56] References Cited

U.S. PATENT DOCUMENTS

| | | | |
|---|---|---|---|
| 2,485,175 | 10/1949 | Trapp | 423/53 |
| 2,704,240 | 3/1955 | Avery | 423/53 |
| 3,887,680 | 9/1975 | MacInnis et al. | 423/53 |
| 4,255,397 | 3/1981 | Martin et al. | 423/53 |
| 4,256,708 | 3/1981 | Quatini | 423/53 |
| 4,348,231 | 9/1982 | Ritsko et al. | 423/53 |

FOREIGN PATENT DOCUMENTS

| | | | |
|---|---|---|---|
| 582921 | 12/1946 | United Kingdom | 423/53 |
| 623577 | 5/1949 | United Kingdom | 423/53 |

*Primary Examiner*—Herbert T. Carter
*Attorney, Agent, or Firm*—Robert E. Walter

[57] ABSTRACT

In a process for recovering refractory metal values from a coated refractory metal carbide cemented with a metal binder, the coated cemented carbide is treated with hydrochloric acid to deteriorate the coating.

1 Claim, No Drawings

RECOVERY OF REFRACTORY METAL VALUES FROM SCRAP CEMENTED CARBIDE

BACKGROUND OF THE INVENTION

This invention relates to the recovery of tungsten values from scrap cemented tungsten carbide.

Recovery of tungsten values from scrap tungsten carbide has been a problem in the carbide industry for a number of years. Cemented carbide tools are made by consolidating extremely hard and fine metal carbide particles together with a suitable binder or cement. Typically, such tools contain tungsten carbide cemented with cobalt although additional carbides such as the carbides of titanium, vanadium, chromium or molybdenum may also be present.

Cobalt is the most widely used cementing material although other cementing materials such as iron, nickel, chromium or molybdenum may be employed. Since all of the materials used in the cemented carbides are extremely valuable, it is desirable to reclaim the materials found therein.

Various processes have been used in the past with varying degrees of success. U.S. Pat. No. 3,953,194 to Hartline et al describes a process for reclaiming cemented metal carbide material by subjecting the metal carbide material to catastrophic oxidation to produce a mixture of metal oxide and the oxide of the cement. The resulting oxide is reduced and finally carbonized.

Another process described in U.S. Pat. No. 3,887,680 to MacInnis, Vanderpool and Boyer wherein tungsten carbide containing an iron group metal such as cobalt is oxidized from a friable oxidation product. The oxidation product is then ground and treated by digesting it in an aqueous solution of alkali metal hydroxide under controlled conditions to recover tungsten values.

Refractory carbides are a mixture of from 4–20% Co, which acts as a binder, with 96–80% carbide. Additives, such as MoC, Vc, TiC, TaC, and NbC may be added to impart certain advantages to the carbide. To recover the valued metals from these carbides, they are oxidized in air or oxygen. The oxidation removes the carbon leaving the W, Ti, Mo, etc. as oxides; which can be further processed to recover the valued metals.

These regular carbides, however, sometimes fail during use because of poor oxidation resistance. The cutting edges become hot and oxidize and therefore become dull. To overcome this, the carbide industry has coated the base carbides with coatings which impart more oxidation resistance to these pieces. These coatings are $Al_2O_3$, TiC and TiN or mixtures of these. They are also putting on multiple coatings such as an inner layer of TiC, followed by a second layer of $Al_2O_3$, then a final outside layer of TiN. When these carbides are fed through the regular air oxidation recovery processes, the TiN and TiC will oxidize if they are not covered with the $Al_2O_3$ type coating. However, the $Al_2O_3$ type coating is virtually unaffected.

SUMMARY OF THE INVENTION

In accordance with the present invention, there is provided a process for recovery of refractory metal values from a coated refractory carbide cemented with a metal binder by treating the coated cemented carbide with hydrochloric acid at a sufficient concentration for a suitable period of time to separate the refractory metal values from the metal binder values.

The present invention is suited for oxidizing carbides which have been treated for oxidation resistance and more specifically it deals with the removal of oxidation resistance coatings from carbide which makes recovery of the W values impractical. Still more specifically, it deals with removing the TiN, TiC, or $Al_2O_3$ type coatings from carbide in multiple layers.

The primary general objective of this invention is to provide a fast practical method for removing the coat or coatings from oxidation resistance carbide.

DETAILED DESCRIPTION

In accordance with the principles of the present invention, coated cemented refractory metal carbide scrap as herein before described is treated with hydrochloric acid to separate the refractory metal values and coating from the binder which is solubilized by the hydrochloric acid. Preferably the treating is carried out for a sufficient period of time to deteriorate substantially and disolve the metal binder. The oxide coating appears to be pervious to the hydrochhloric acid so that the binder is attacked even though the scrap piece is completely surrounded by an oxide coating which is substantially insoluble in hydrochloric acid. If the metal binder is cobalt, the process of the present invention is particularly suited for recovering cobalt values and refractory metal values.

The level of cobalt depends upon the end use of the cemented carbide but most commerical cemented refractory metal carbides contain from about 4 to 25% by weight cobalt. The scrap material is digested in an aqueous hydrochloric acid solution for a sufficient time to produce an aqueous acid cobalt chloride solution. Preferably an azeotropic hydrochloric acid solution is used which comprises about 20 percent hydrochloric acid and has a boiling point of about 110° C. While both higher and lower concentrations of acid than the azeotrope can be initially used, water is given off until the azeotrope is reached when weaker acids are used and hydrochloric acid is given off when stronger acids than the azeotropic acids are used. As a result, the azeotropic concentration is reached after prolonged digestion of the scrap. Preferably, an excess of hydrochloric acid is used in an amount greater than at least 200 percent of the amount theoretically required to react with the scrap material.

After digestion under the above conditions, the refractory metal carbide is depleted of cobalt, that is it generally contains less than about 0.5 percent by weight cobalt. The resulting solution contains a variety of anions and cations such as iron, manganese, copper, aluminum, chromium, magnesium, nickel, calcium, sodium, potassium, silver, etc. depending on the composition of cemented carbide.

The matrix or binder depleted refractory carbide, including insoluble coating material, is separated from the aqueous solution containing metal binder. The resulting matrix depleted metal carbide and coating material has a constituency based on the constituency of the metal carbide in the starting scrap and includes coating material. The physical size of depleted carbide pieces may approach the size of the original pieces but in a skeleton form. These skeleton pieces are preferably comminuted to give a resulting powder refractory metal carbide.

The resulting metal carbide powder which typically comprises a major portion tungsten carbide may be oxidized in air to tungsten oxide powder at a temperature of from about 825° C. to about 850° C. Although higher temperatures and lower temperatures can be used, the oxidation rate is slow at temperatures below 825° C.

Next, the tungsten oxide powder which includes oxides of the coating material is digested with aqueous alkali metal hydroxide. Although any alkali metal hydroxide can be used, sodium hydroxide is preferred because of its availability and cost. An aqueous solution containing from about 20 to about 50 percent sodium hydroxide is further preferred. The oxidized material is charged to the alkali metal hydroxide at a temperature of at least about 20° C. At least the stoichiometric amount of the alkali metal hydroxide must be present to enable an alkali metal tungstate to be formed. An excess of about 50 percent of theory is preferred to ensure that all of the tungsten values are converted to a soluble tungsten form. The pressure used during digestion is generally from about 50 to 200 psig. The temperature used during digestion is generally from about 140° C. to 195° C. About 6 to 10 hours is required to convert the tungsten to a water soluble form at the foregoing temperatures and pressures. Higher pressures and higher temperatures tend to promote and shorten the time required, however, use of temperatures above 170° C. and pressures above 115 psig. do not appreciably effect the rate of reaction. Since it is more costly to use higher temperatures and pressures, the before recited temperatures are generally not exceeded. The coating material constituents may be separated from the soluble sodium tungstate during normal processing.

EXAMPLE

Scrap material containing about 454 parts of rectangular-shaped pieces of cemented carbide having dimensions of less than about one square inch and coated with various coatings such as aluminum oxide is digested under reflux for about seven days with about 717 parts of azeotropic (20.24 percent) HCl. At the end of this time, the carbide is in the form of a depleted skeleton. The depleted skeleton material which includes $Al_2O_3$ coating material is crushed into a powder and the resulting powder is fired in air for about 2 hours at 825 degrees centigrade. The powder is charged into a pressure reactor containing an aqueous solution of about 30 percent sodium hydroxide at about 20° C. The temperature is increased until the pressure is about 115 pounds per square inch. After maintaining the temperature and pressure for about 7 hours, the material is cooled and filtered. The filtrate is analyzed and determined to contain about 95 percent of the total tungsten as soluble tungstate.

I claim:

1. A process for recovering tungsten values from a tungsten carbide cemented with binder metal having an aluminum oxide coating comprising treating said coated cemented tungsten carbide with an azeotropic solution of hydrochloric acid for a sufficient period of time to permit said hydrochloric acid to permeate said aluminum oxide coating and dissolve said binder metal and yield a binder depleted tungsten carbide including coating, said aluminum oxide coating being substantially insoluble in said hydrochloric acid, separating said binder depleted tungsten carbide and coating from said solution of hydrochloric acid containing dissolved binder metal, comminuting said depleted tungsten carbide to form a tungsten carbide powder, oxidizing said tungsten carbide powder in a gas containing oxygen to form a tungsten oxide powder, and digesting said tungsten oxide powder in an aqueous solution of sodium hydroxide to form a soluble tungstate.

* * * * *